Figure 1:
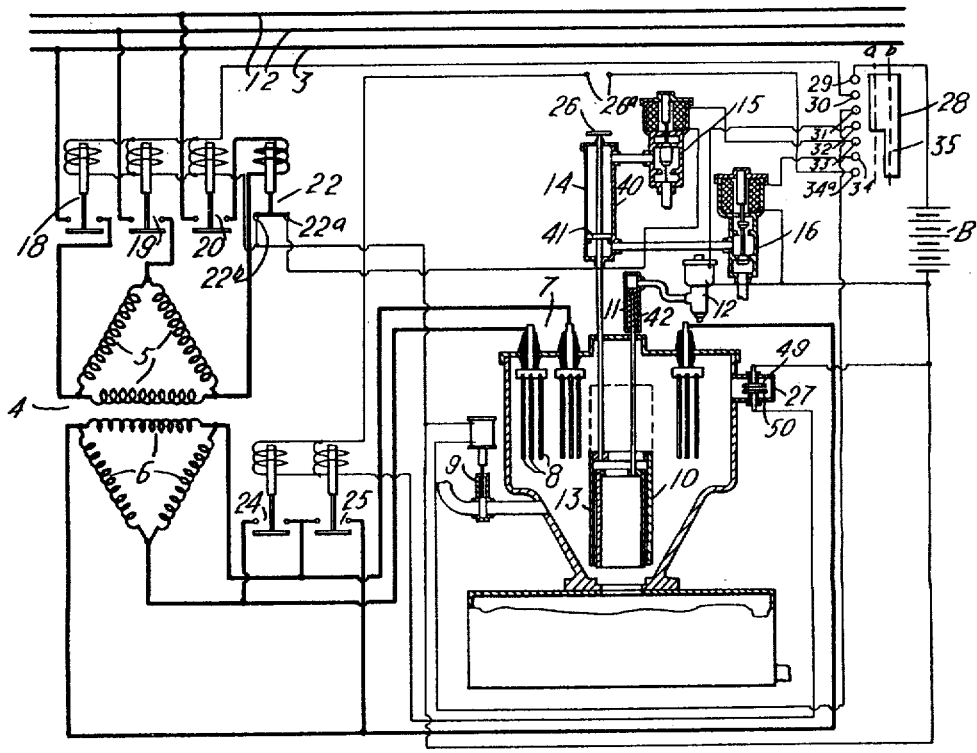

K. A. SIMMON & A. J. HALL.
CONTROL SYSTEM.
APPLICATION FILED APR. 6, 1914.

1,241,566.

Patented Oct. 2, 1917.

WITNESSES:
F. A. Lind.
D. H. Mace.

INVENTORS
Karl A. Simmon
Arthur J. Hall
BY
Wesley E. Carr
ATTORNEY

UNITED STATES PATENT OFFICE.

KARL A. SIMMON AND ARTHUR J. HALL, OF WILKINSBURG, PENNSYLVANIA, ASSIGNORS TO WESTINGHOUSE ELECTRIC AND MANUFACTURING COMPANY, A CORPORATION OF PENNSYLVANIA.

CONTROL SYSTEM.

1,241,566.  Specification of Letters Patent.  Patented Oct. 2, 1917.

Application filed April 6, 1914. Serial No. 830,096.

*To all whom it may concern:*

Be it known that we, KARL A. SIMMON, a citizen of the United States, and a resident of Wilkinsburg, in the county of Allegheny and State of Pennsylvania, and ARTHUR J. HALL, a subject of the King of Great Britain, and a resident of Wilkinsburg, in the county of Allegheny and State of Pennsylvania, have invented a new and useful Improvement in Control Systems, of which the following is a specification.

Our invention relates to control systems for dynamo-electric machines, with particular reference to systems adapted to govern the operation of polyphase induction motors through the agency of regulatable liquid rheostats.

One of the objects of our invention is to provide a system of the above-indicated class which shall embody an auxiliary circuit, the completion of which is effected directly by the electrolyte within the rheostat when it reaches a predetermined level.

Another object of our invention is to provide a control system in which a plurality of auxiliary switches are employed for short-circuiting a liquid rheostat under predetermined conditions, and to provide simple, reliable and effective means, in which no moving parts are employed, for effecting the closure of the short-circuiting switches at a predetermined level of the electrolyte within the rheostat.

A still further object of our invention is to provide a so-called "electrolytic interlock" for a liquid rheostat which shall be simple, compact and durable in construction, and which shall perform its intended functions with positiveness and rapidity, and which, moreover, shall not be subject to wear and mechanical injury.

Heretofore, when liquid rheostats have been employed, it has been customary to provide short-circuiting switches which were interlocked through auxiliary switches that were associated with movable floats to be raised to cause the interlock switches to complete the energizing circuits when a predetermined level of electrolyte was attained.

However, much difficulty has been experienced with interlocking switches of the float type, for the reason they embody movable parts which are liable to wear and to become displaced through mechanical shocks and jars. Moreover, a considerable difference of electrolyte level is essential to effect the closure of such float-actuated switches and to produce sufficient contact pressure between the switch members to result in positive and reliable electrical connections. Furthermore, the surface of the rising electrolyte is always disturbed to some extent, which causes a bobbing of the float and, therefore, an intermittent make and break of the circuit and variation in contact pressure.

According to our present invention, we contemplate providing adequate means for overcoming the difficulties heretofore experienced, and to secure the beneficial and advantageous results hereinbefore mentioned.

Figures 2, 3, 4:
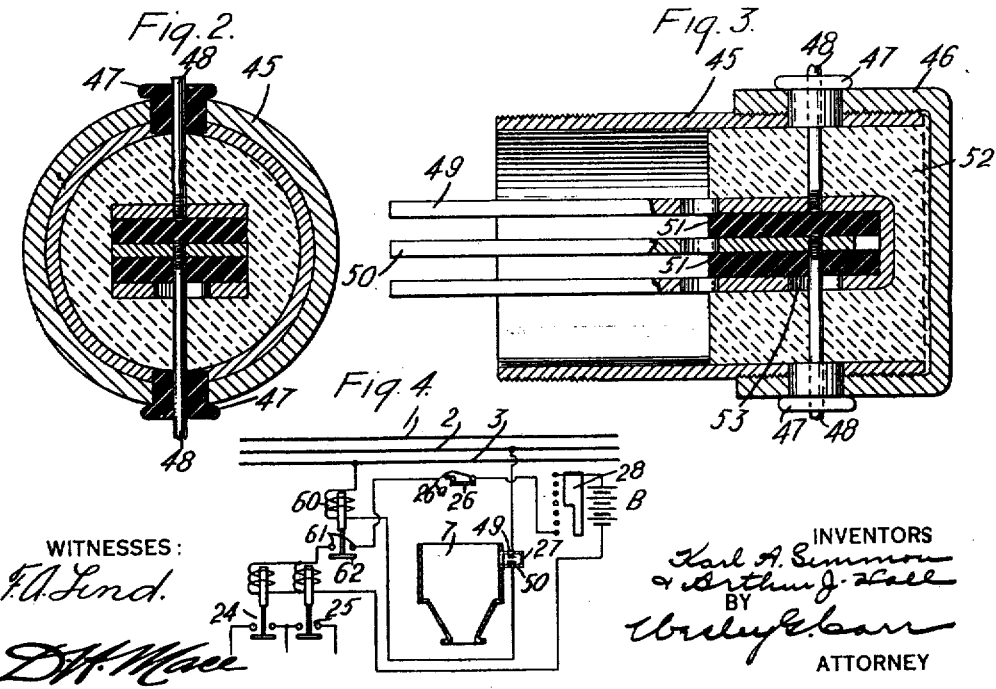

Our invention may best be understood by reference to the accompanying drawing, in which Figure 1 is a diagrammatic view of a system of control embodying our invention; Figs. 2 and 3 are, respectively, a sectional view, and a view, partially in section and partially in side elevation, of an "electrolytic interlock" constructed in accordance with our invention, and Fig. 4 is a diagrammatic view of a portion of a system embodying a modified form of our invention.

Referring to the drawing, the system shown comprises a plurality of supply circuit conductors 1, 2 and 3; a polyphase induction motor 4 adapted to receive energy therefrom and having primary windings 5 and secondary windings 6; a liquid rheostat 7 for governing the speed of operation of the induction motor 4, said rheostat embodying a plurality of sets of coöperating electrodes 8, and an electrically operated inlet valve 9 for controlling the admission of electrolyte thereto; a discharge valve 10 and a pneumatically operated device 11 controlled by an electrically operated valve 12 for governing the operation of the discharge 10; a regulating valve 13 operated by a pneumatic device 14 which is controlled by electrically operated valves 15 and 16 for raising and lowering the regulating valve 13 for the purpose of fixing the height of the electrolyte within the rheostat; a plurality of electrically operated line switches 18, 19 and 20 for establishing connections between the supply circuit conductors 1, 2 and 3 and the primary windings 5 of the motor 4; a limit switch 22 for automatically controlling the operation of the regulating valve 13; a plurality of auxiliary electrically operated switches 24 and 25 for short-circuiting the secondary windings 6 of the motor 4; an auxiliary interlocking switch 26 that is dependent for its operation, upon the action of the regulating valve 13; an "electrolytic interlock" 27 associated with the liquid rheostat 7 and adapted to coöperate with the interlocking switch 26 for energizing the short-circuiting switches 24 and 25 when the electrolyte has risen to a predetermined level; a master switch 28 comprising a plurality of contact terminals 29 to 34, inclusive, and a movable contact segment 35 adapted to engage the contact terminals along the position-indicating lines a and b, and a battery B, or other suitable source of energy.

The construction and operation of the rheostat 7 and its operating mechanism, except in so far as the electrolytic interlock 27 is concerned, is set forth fully in our copending application Serial No. 846,287, filed June 20, 1914, and, therefore, only a brief and general description thereof will be given. In reciting the circuit connections, only the various pieces of apparatus will be enumerated while the several conductors will be omitted for the sake of simplicity.

The operating device 14 for the regulating valve 13 comprises a cylinder 40 and a movable piston 41. The electrically controlled valve 15 is normally deënergized and open to admit fluid pressure from a suitable source (not shown) to the upper side of the piston 41, while the valve 16 is normally closed, when deënergized, and establishes a communication from the lower end of the cylinder 40 to the atmosphere. When the operating coils of both of the valves 15 and 16 are energized, pressure is exhausted from above the piston 41 and is admitted below it, thereby causing the regulating valve 15 to be raised.

The operating device 11 normally maintains the discharge valve 10 in its upper position by reason of a spring 42.

Particular reference may now be had to Figs. 2 and 3 in which the auxiliary "electrolytic interlock" 27 comprises a tubular member 45 which is screw-threaded at both its ends, one end being provided with a cap 46, through the opposite sides of which bushings 47 and contact members 48 project. Centrally disposed within the tubular member 45, and projecting therefrom, are a plurality of conducting members 49 and 50. The member 49 is of U-shape and the member 50 is disposed intermediate the sides of the member 49 and is spaced therefrom and held in position by a plurality of insulating blocks 51. The U-shaped member 49 is firmly embedded in a body of insulating cement 52, or other suitable material, and said member is intimately engaged by the inner end of one of the members 48. The member 49 is further provided with an opening 53 through which the other conducting member 48 projects, the latter member being secured to, and electrically connected with, the conducting member 50.

When the electrolytic interlock 27 is assembled, the member 45 is screwed into an opening in the rheostat 7, substantially at a height corresponding to the maximum level of the electrolyte, as shown in Fig. 1, and, hence, the electrolyte serves to complete a circuit between the coöperating conducting members 49 and 50.

Assuming that the arrangement of apparatus and circuit connections are as shown in Fig. 1, the operation of the system is as follows: The master switch 28 is first moved into its position a, thereby completing a circuit from the positive side of the battery B through contact terminals 29 and 30, which are bridged by the conducting segment 35, and energizing coils of the line switches 18, 19 and 20 to the negative side of the battery. Another circuit is established from the contact terminal 31 of the master switch 28 through the energizing coil of the inlet valve 9 to the battery, and still another circuit from contact terminal 32 through the energizing coils of the discharge valve 12 to the battery is completed.

Thus, the switches 18, 19 and 20 are closed to connect the motor 4 to the supply circuit conductors 1, 2, and 3, while the inlet valve 9 is opened to permit the circulation of electrolyte from a suitable source (not shown) into the rheostat 7. Also, the discharge valve 10 is forced downwardly to its closed position by the operating device 11. The admission of electrolyte then fills the rheostat 7 to a height corresponding to the upper end of the discharge valve 13, at which height the electrodes 8 are partially immersed. The motor 4 is, therefore, started into operation.

If the master controller 28 be caused to assume its position b, a circuit is completed from contact terminal 33, which includes the energizing coil of the valve 15 and coöperating switch members 22ᵃ and 22ᵇ of the limit switch 22 to the battery. Another circuit is also completed from the contact terminal 34 through the energizing coil of the valve 16 to the battery.

Under these conditions, the operating device 14 raises the regulating valve 13 in accordance with the action of the limit switch 22, it being understood that, if the motor current exceeds the value for which the limit switch 22 is adjusted, the energizing coil of the valve 15 is deënergized, thereby effecting balanced pressures on the opposite sides of the piston 41 and arresting its movement until the current decreases below a predetermined amount.

Assuming that the operation of the rheostat 17 has proceeded until the regulating valve 13 occupies its upper position, the interlocking switch 26 bridges its coöperating stationary contact terminals 26ª and, hence, a circuit is completed from contact terminal 34ª of the master controller 28 through interlock switch members 26 and 26ª, energizing coils of the short-circuiting switches 24 and 25 and the "electrolytic interlock" 27 to the battery, provided, of course, that the electrolyte supply system is operative and that the level of the electrolyte within the rheostat 7 is sufficient to cause the electrolyte itself to bridge the gap between the contact plates 49 and 50.

It is evident, therefore, that it will be impossible to close the short-circuiting switches 24 and 25 unless the circulating system is operating properly and the rheostat is filled to its maximum height, even though the regulating valve 13 has been moved to its upper position. The "electrolytic interlock" 27 is also desirable for the reason that its circuit is quickly completed by a relatively small rise of electrolyte, and the completion of its circuits by the electrolyte itself is positive and reliable and does not involve the uncertainty of movable parts.

Referring to Fig. 4, we have shown a portion of a modified system embodying our invention, in which we have made provision for the utilization of alternate current energy in connection with the "electrolytic interlock," whereby the contact members of the interlock are not subject to deterioration through the action of electrolysis.

In order to accomplish this end, we employ an alternating current relay 60, the energizing coil of which is connected in circuit with the coöperating contact members 49 and 50 of the electrolytic interlock 27, the energy being supplied from one of the phases of the supply circuit or from any other suitable source of alternating current energy. The relay 60 is provided with coöperating stationary and movable contact members 61 and 62 which are adapted to complete the energizing circuit of the coils of the short-circuiting switches 24 and 25 whenever the electrolytic interlock 27 is immersed in electrolyte and the interlock switch members 26 and 26ª are closed, in the manner hereinbefore set forth.

Although we have found the structure shown in Figs. 2 and 3 to be of particular merit, our invention is not limited to its specific details, nor is our invention restricted to any particular type of control systems, dynamo-electric machines or liquid rheostats, and we desire therefore, that only such limitations shall be imposed as are indicated in the appended claims.

We claim as our invention:

1. The combination with a liquid rheostat and a plurality of auxiliary spaced and insulated contact members associated therewith and adapted to be bridged by the electrolyte, of a source of alternating current connected through said contact members, whereby electrolysis of said members is prevented.

2. The combination with a liquid rheostat and an electrolytic interlock switch associated therewith and comprising a plurality of spaced and insulated contact members adapted to be bridged by the electrolyte, of an auxiliary circuit connected through said electrolytic interlock switch and a source of alternating current energy for supplying energy to said circuit.

3. The combination with a liquid rheostat having an electrolytic interlock switch associated therewith and adapted to be closed when the electrolyte reaches a predetermined height, and an alternating current relay in circuit with said electrolytic interlock, of means dependent upon said relay for short-circuiting said rheostat.

4. The combination with a liquid rheostat having an electrolytic interlock switch associated therewith and adapted to be closed when the electrolyte reaches a predetermined height, and an alternating current relay in circuit with said electrolytic interlock, of an electrically operated short-circuiting switch, and a control circuit therefor governed by said relay.

5. The combination with a liquid rheostat, a source of alternating current energy connected thereto, and means for short-circuiting said rheostat, of a plurality of insulated contact members associated with said rheostat and adapted to be immersed in the electrolyte, under predetermined conditions, an alternating current relay connected to said source and having a circuit including said contact members, and means coöperating with said relay for actuating said short-circuiting means.

6. An electrical device comprising a U-shaped conducting member, having an aperture therein, an electrical connection to said U-shaped member, another conducting member disposed intermediate the arms of said U-shaped member and an electrical connection projecting through said aperture to said conducting member.

7. An electrical device comprising a tubular member, a U-shaped electrically active member having a relatively large aperture in one arm, another electrically active member insulatedly located between the arms of said U-shaped member, means for insulatedly securing said electrically active members within said tubular member, and spaced electrical conductors insulatedly extending through said sleeve and respectively electrically secured to the unapertured arm of said U-shaped member and to said other electrically active member after projecting through said aperture.

In testimony whereof, we have hereunto subscribed our names this 31st day of March, 1914.

KARL A. SIMMON.
ARTHUR J. HALL.

Witnesses:
C. C. WHITTAKER,
B. B. HINES.

Copies of this patent may be obtained for five cents each, by addressing the "Commissioner of Patents, Washington, D. C."